United States Patent
Ishihara et al.

(10) Patent No.: US 10,568,148 B2
(45) Date of Patent: Feb. 18, 2020

(54) SYSTEMS AND METHODS FOR COMMUNICATING NOTICES WITHIN A VEHICLE USING A MOBILE DEVICE

(71) Applicant: Toyota Motor Engineering & Manufacturing North America, Inc., Erlanger, KY (US)

(72) Inventors: Mikiya Ishihara, Plano, TX (US); Yi Li, Ann Arbor, MI (US); Kazutoshi Ebe, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 510 days.

(21) Appl. No.: 15/428,394

(22) Filed: Feb. 9, 2017

(65) Prior Publication Data

US 2018/0211527 A1    Jul. 26, 2018

Related U.S. Application Data (60) Provisional application No. 62/449,626, filed on Jan. 24, 2017.

(51) Int. Cl.
*H04W 76/10* (2018.01)
*H04W 4/02* (2018.01)

(52) U.S. Cl.
CPC ........... *H04W 76/10* (2018.02); *H04W 4/026* (2013.01)

(58) Field of Classification Search
CPC .............................. H04W 76/10; H04W 4/026
See application file for complete search history.

(56) References Cited

U.S. PATENT DOCUMENTS

| | | | |
|---|---|---|---|
| 4,914,605 A * | 4/1990 | Loughmiller, Jr. | ............................. G01C 21/3673 340/995.1 |
| 8,290,480 B2 * | 10/2012 | Abramson | ............... H04L 67/12 455/418 |
| 8,390,440 B2 | 3/2013 | Krautter et al. | |
| 9,253,603 B1 | 2/2016 | Dong et al. | |
| 9,576,322 B1 * | 2/2017 | Christensen | ........... G06Q 40/08 |
| 10,424,022 B2 * | 9/2019 | Bowne | .................... G01S 19/13 |
| 2009/0319095 A1 | 12/2009 | Cech et al. | |
| 2011/0307188 A1 * | 12/2011 | Peng | .................. G06Q 10/0639 702/33 |

(Continued)

*Primary Examiner* — Joseph H Feild
*Assistant Examiner* — Rufus C Point
(74) *Attorney, Agent, or Firm* — Christopher G. Darrow; Darrow Mustafa PC (57) ABSTRACT

System, methods, and other embodiments described herein relate to controlling a mobile device to provide notices within a vehicle. In one embodiment, a method includes, in response to an electronic signal indicating an occurrence of an event associated with the vehicle, identifying whether a mobile device is actively in use by a passenger of the vehicle. The method further includes determining a viewing orientation for a display of the mobile device by analyzing state information from the mobile device about a present mode of operation for the display in relation to a relative alignment with the vehicle. The method also includes controlling the mobile device to display the notice according to the viewing orientation by wirelessly instructing the mobile device to render the notice on the display as a function of the viewing orientation to display the notice relative to an alignment between the vehicle and the mobile device.

20 Claims, 6 Drawing Sheets

(56) References Cited

U.S. PATENT DOCUMENTS

| | | | |
|---|---|---|---|
| 2012/0071151 A1* | 3/2012 | Abramson | H04L 67/12 |
| | | | 455/418 |
| 2012/0214463 A1* | 8/2012 | Smith | H04M 1/72577 |
| | | | 455/418 |
| 2013/0150004 A1* | 6/2013 | Rosen | H04W 8/22 |
| | | | 455/414.1 |
| 2013/0344859 A1* | 12/2013 | Abramson | H04M 1/72577 |
| | | | 455/418 |
| 2014/0191883 A1 | 7/2014 | Bolton et al. | |
| 2015/0025917 A1* | 1/2015 | Stempora | G06Q 40/08 |
| | | | 705/4 |
| 2015/0054639 A1* | 2/2015 | Rosen | G06K 9/00785 |
| | | | 340/439 |
| 2015/0127390 A1* | 5/2015 | Bowne | G06Q 10/0639 |
| | | | 705/4 |
| 2015/0316765 A1 | 11/2015 | Kim et al. | |
| 2016/0018822 A1 | 1/2016 | Nevdahs et al. | |
| 2016/0090055 A1 | 3/2016 | Breed | |
| 2017/0105098 A1* | 4/2017 | Cordova | H04L 43/16 |
| 2017/0138737 A1* | 5/2017 | Cordova | G01C 21/165 |
| 2017/0303095 A1* | 10/2017 | Cordova | G01C 21/20 |
| 2018/0211527 A1* | 7/2018 | Ishihara | H04W 76/10 |
| 2019/0230212 A1* | 7/2019 | Spracklin | H04M 1/72569 |

* cited by examiner

SYSTEMS AND METHODS FOR COMMUNICATING NOTICES WITHIN A VEHICLE USING A MOBILE DEVICE

CROSS REFERENCE TO RELATED APPLICATIONS

This application claims benefit of U.S. Provisional Application No. 62/449,626, filed on Jan. 24, 2017, which is herein incorporated by reference in its entirety.

TECHNICAL FIELD

The subject matter described herein relates in general to systems for providing notices and more particularly to systems for providing notices to passengers of a vehicle.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As mobile devices such as smartphones, tablets, laptops and so on become increasingly prevalent, these devices also become further integrated into daily life. Accordingly, use of mobile devices in vehicles while driving is also becoming more prevalent. Consequently, both drivers and passengers are increasingly distracted from the operation of the vehicle and events around the vehicle. In other words, the presence of mobile devices within the vehicle increases a tendency of the occupants to be distracted from gauges and other indicators that provide vehicle operating parameters such as speed, fuel levels, mileage, maintenance notices and so forth in addition to traffic and other extraneous events.

Moreover, with the advent of autonomous vehicles, the distraction of vehicle occupants is even greater since attention to the vehicle is less critical when operating in an autonomous mode. For example, the driver may rotate his seat to face other passengers in a back seat area while using a mobile device or may direct attention to a mobile device that is showing entertainment content instead of watching an instrument panel of the vehicle. Thus, traditional forms of conveying notices and other vehicle operating parameters to the driver and the passengers may not be effective when mobile devices are in use. Consequently, difficulties arise with ensuring passengers including the driver are appropriately notified of various events.

SUMMARY

An example of an indication system for a vehicle that may operate in an autonomous mode is presented herein. The indication system can provide notices to a passenger of the vehicle by controlling mobile devices in use within the vehicle. This arrangement may be useful given the possibility that a passenger may be inattentive to displays in the vehicle, especially when the vehicle is operating in an autonomous mode. In further aspects, the indication system determines a particular orientation of the mobile device so that notices may be provided relative to a direction associated with the notices.

In one embodiment, an indication system of a vehicle is disclosed. The indication system includes one or more processors and a memory communicably coupled to the one or more processors. The memory stores an orientation module and a notice module that both include instructions that when executed by the one or more processors cause the one or more processors to perform various functions. The orientation module includes instructions to, in response to an electronic signal indicating an occurrence of an event associated with the vehicle, identify whether a mobile device is actively in use by a passenger of the vehicle. The event is an incident associated with the vehicle for which the passenger is to be notified. The orientation module also includes instructions to, when the mobile device is in active use, determine a viewing orientation for a display of the mobile device by analyzing state information from the mobile device about a present mode of operation for the display in relation to a relative alignment with the vehicle. The notice module includes instructions to control the mobile device to display the notice according to the viewing orientation by wirelessly instructing the mobile device to render the notice on the display as a function of the viewing orientation to display the notice relative to an alignment between the vehicle and the mobile device.

In one embodiment, a non-transitory computer-readable medium is disclosed. The computer-readable medium stores instructions that when executed by one or more processors cause the one or more processors to perform the disclosed functions. The instructions include instructions to, in response to an electronic signal indicating an occurrence of an event associated with a vehicle, identify whether a mobile device is actively in use by a passenger of the vehicle. The event is an incident associated with the vehicle for which the passenger is to be notified. The instructions include instructions to, when the mobile device is in active use, determine a viewing orientation for a display of the mobile device by analyzing state information from the mobile device about a present mode of operation for the display in relation to a relative alignment with the vehicle. The instructions include instructions to control the mobile device to display the notice according to the viewing orientation by wirelessly instructing the mobile device to render the notice on the display as a function of the viewing orientation to display the notice relative to an alignment between the vehicle and the mobile device.

In one embodiment, a method of providing notifications within a vehicle is disclosed. The method includes, in response to an electronic signal indicating an occurrence of an event associated with the vehicle, identifying whether a mobile device is actively in use by a passenger of the vehicle. The event is an incident associated with the vehicle for which the passenger is to be notified. The method also includes, when the mobile device is in active use, determining a viewing orientation for a display of the mobile device by analyzing state information from the mobile device about a present mode of operation for the display in relation to a relative alignment with the vehicle. The method includes controlling the mobile device to display the notice according to the viewing orientation by wirelessly instructing the mobile device to render the notice on the display as a function of the viewing orientation to display the notice relative to an alignment between the vehicle and the mobile device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with controlling a mobile device to provide notices within a vehicle are disclosed herein. As mentioned in the background, because passengers of the vehicle may be inattentive to the operation of the vehicle and also inattentive to other events occurring around the vehicle, notifying the passengers about various events may be difficult. Accordingly, in one embodiment, the disclosed systems and methods are implemented to facilitate communicating notices to the passengers using mobile devices present within the vehicle. In one embodiment, the disclosed systems and methods are implemented within a vehicle that operates in an autonomous mode since there is a tendency for passengers of a vehicle operating autonomously to be inattentive.

For example, when a passenger is to be notified of an event, an indication system determines whether the passenger is using a mobile device and then controls the mobile device to communicate the notice to the passenger. However, simply controlling the mobile device to communicate the notice may not be sufficient in some circumstances. That is, because the mobile device is not restricted to operating in a certain orientation or position within the vehicle, notices that relate information about directions or other spatially related events (e.g., turning left, hazard ahead) may not be conveyed correctly when displayed if the mobile device is misaligned with the vehicle.

As one example, the passenger may be seated in a rear-facing position toward a rear/aft section of the vehicle, lying sideways, or otherwise not positioned upright and facing directly forward as may be expected. Consequently, when the indication system is to provide a notice about an event that relates to a spatial component of the vehicle (e.g., right, left, forward, rear), the indication system first determines an orientation of the mobile device relative to the vehicle. Thereafter, the indication system can control the mobile device to appropriately display the notice in relation to, for example, a particular part of the display of the mobile device that corresponds with a direction of the event. In this way, the indication system coordinates the display of notices relative to a position/orientation within the vehicle to properly align with the vehicle.

Consider the following example. The vehicle is operating in an autonomous mode, and the passenger (i.e., driver) rotates a seat to a substantially reversed position. Accordingly, the passenger is facing an aft/rear section of the vehicle while the car is traveling forward. Additionally, a mobile device (i.e., the passenger's smartphone) is connected with a wireless access point of the vehicle and the mobile device is actively in use by the passenger. Thus, as one example, when the vehicle is turning left while operating autonomously, the indication system, which is aware of the orientation of the mobile device through the wireless connection, controls the wireless device to illuminate a right hand side of the display of the mobile device corresponding with the left hand turn. Consequently, the indication system adaptively controls the mobile device according to different orientations of the mobile device to convey spatial information about operation of the vehicle.

Figure 1:
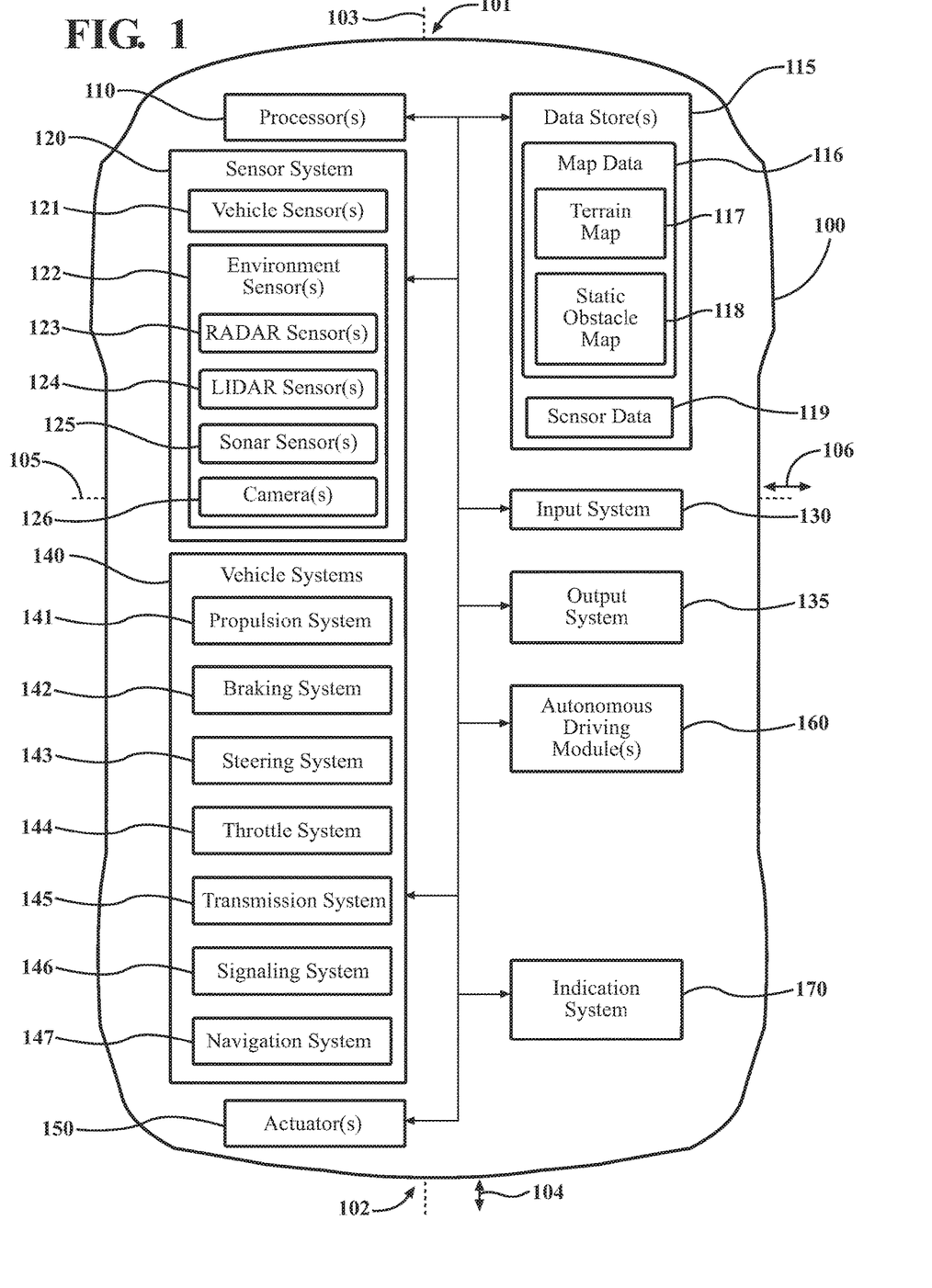
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be a watercraft, an aircraft or any other form of motorized transport.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle along a travel route using one or more computing systems to control the vehicle with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle along a travel route.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced various combinations of these elements.

In either case, the vehicle 100 includes an indication system 170 that is implemented to perform methods and other functions as disclosed herein relating to controlling a mobile device within the vehicle 100 to communicate notices to passengers of the vehicle 100. The noted functions and methods will become more apparent with further discussion of the figures.

Figure 2:
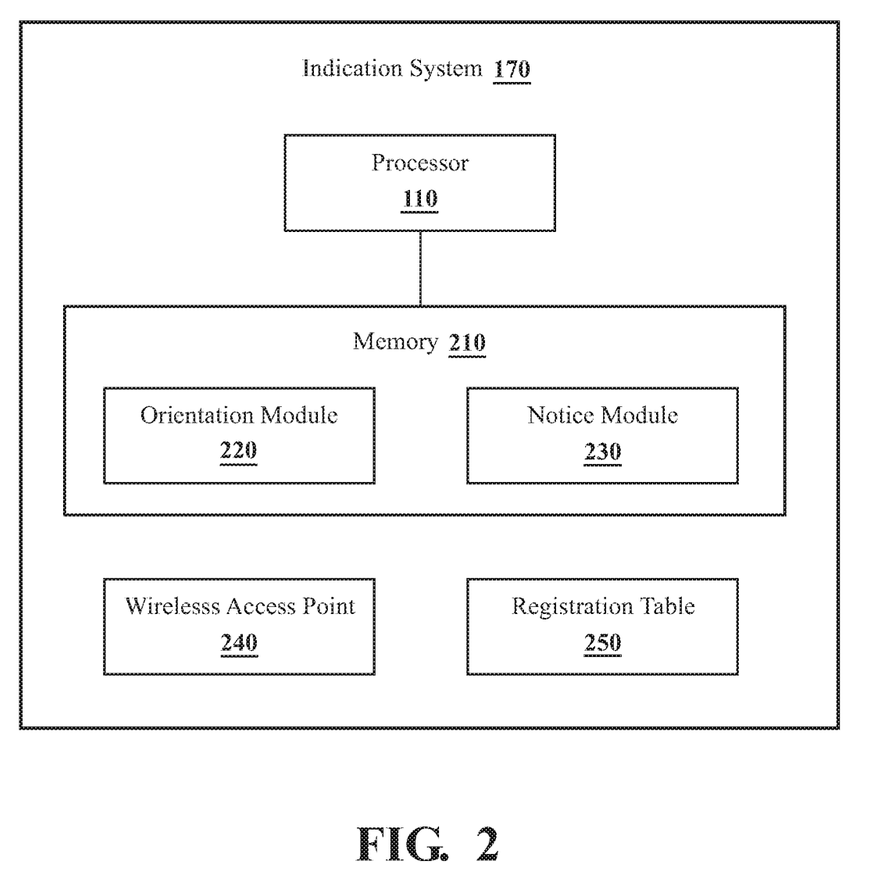
FIG. 2 illustrates one embodiment of an indication system that is associated with displaying notices on a mobile device according to an orientation of the mobile device within a vehicle.

With reference to FIG. 2, one embodiment of the indication system 170 of FIG. 1 is further illustrated. The indication system 170 is shown as including the processor 110 from the vehicle 100 of FIG. 1. Accordingly, the processor 110 may be a part of the indication system 170 or the indication system 170 may include a separate processor from the processor 110 of the vehicle 100. In one embodiment, the indication system 170 includes a memory 210 that stores an orientation module 220 and a notice module 230. The memory 210 is a random access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the orientation module 220 generally includes instructions that function to control the processor 110 to determine aspects of operation of a mobile device. In other words, the orientation module 220 includes instructions to determine which direction within the vehicle 100 a display of the mobile device is directed toward and how the display is oriented (e.g., portrait, landscape, etc.). Additionally, in one embodiment, the notice module 230 uses the information determined by the orientation module 220 about the mobile device to control the mobile device to display notices according to a spatial relationship to the vehicle 100.

Additional aspects of determining the orientation of the mobile device and controlling the mobile device to display the notice will be discussed subsequently. In one embodiment, both the orientation module 220 and the notice module 230 communicate with the mobile device through a wireless access point 240. While the modules 220 and 230 are discussed as communicating with the mobile device using the wireless access point 240, of course, in other implementations different forms of communications are used. For example, a wired Ethernet connection, USB connection, docking port, or another form of connection may be used to provide communications between the indication system 170 and the mobile device. In either case, the modules 220 and 230 communicate with the mobile device upon the mobile device being registered in the registration table 250.

In one embodiment, the wireless access point 240 transmits a beacon communication to inform mobile devices within a passenger compartment of the vehicle 100 that the wireless access point 240 is available to provide access to one or more resources. The wireless access point 240 may wirelessly communicate according to one or more protocols including IEEE 802.11, Bluetooth, or another suitable protocol. Furthermore, in one embodiment, the wireless access point 240 may be a mobile hotspot that provides access to the Internet or another network. Additionally, the wireless access point 240 provides, for example, an interface to various systems of the vehicle 100 including vehicle systems 140, autonomous driving modules 160, entertainment systems (e.g., stereo, radio, etc.) and so on. Additionally, while the wireless access point is shown and described as part of the indication system 170, in one embodiment, the indication system 170 controls a separate wireless access point to perform the noted functions.

Once a mobile device detects and responds to the beacon, the wireless access point 240 establishes a connection with the mobile device. In one embodiment, establishing a connection includes performing a 3-way authentication handshake or another authentication routine to establish a secure connection and ensure the mobile device is authorized to connect. Furthermore, the wireless access point 240, in one embodiment, registers the mobile device in the registration table 250 by generating an entry indicating at least a hardware identifier of the mobile device. In further embodiments, the wireless access point 240 stores information regarding a user id of a passenger, a seat in the vehicle 100 associated with the mobile device, and other information that is relevant to interactions between the mobile device and the wireless access point 240.

After registration of the mobile device, the orientation module 220 and the notice module 230 can communicate with the mobile device. In general, the modules 220 and 230 communicate with any number of devices listed in the registration table 250. In one embodiment, the registration table 250 stores passenger identification information for each registered mobile device in the vehicle including devices connected via wireless and wired connections. Thus, the modules 220 and 230 may selectively direct notices to a mobile device listed in the registration table 250 that is associated with a driver of the vehicle and/or other passengers depending on characteristics of a particular notice (e.g., emergency vs. general notice) and a group that is to be informed about the particular class of notice. For purposes of this discussion, all occupants of the vehicle 100 are generally referred to as passengers including the driver/vehicle operator.

Figure 3:
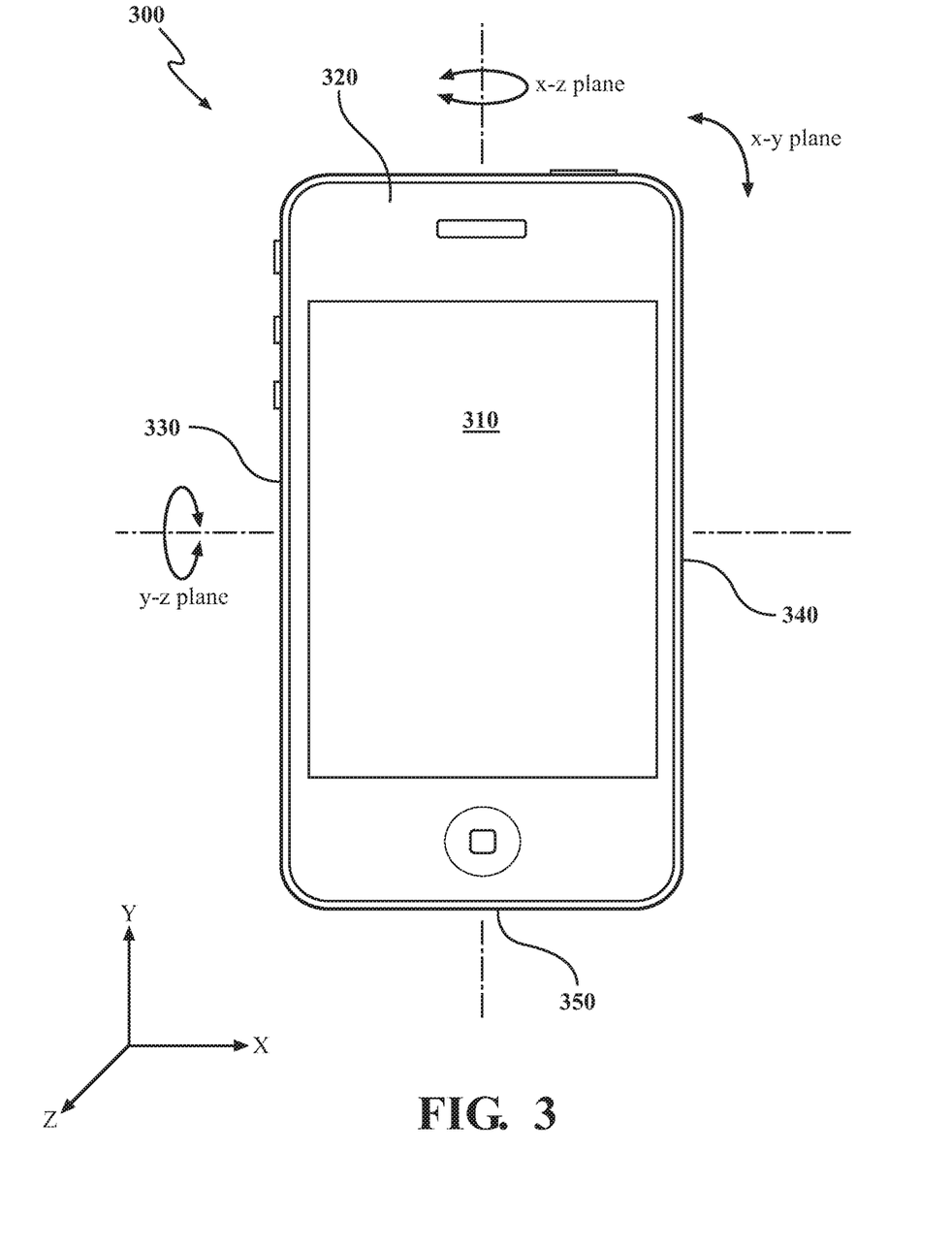
FIG. 3 illustrates one example of a mobile device.

FIG. 3 generally illustrates one example of a mobile device 300 that may interact with the indication system 170. The mobile device 300 is, for example, a smartphone, a laptop, a tablet, a wrist watch, or another device that may communicate with the indication system and is capable of providing notices to the passengers. Additionally, the mobile device 300 may communicate using a wired or wireless connection with the vehicle 100 and the indication system 170. Furthermore, the mobile device 300 includes a display 310 that displays various content generated by the mobile device 300. In addition to the display 310, in various implementations, the mobile device 300 also includes a speaker, one or more buttons, LED indicators, additional display screens and other elements that are not illustrated. In various embodiments, the mobile device 300 also includes one or more antennae, one or more hardware processors, a display controller, a cellular communication radio, memory (non-volatile and volatile), an operating system and other components as may be expected on such devices.

In one embodiment, the mobile device 300 also includes various internal sensors. The internal sensors may include a global positioning system (GPS), accelerometer(s), a compass, gyroscope(s), barometer(s), proximity sensor(s), capacitive touch sensor(s), camera(s), magnetometer(s), light sensor(s), thermometer(s), pedometer(s), and so on.

As illustrated in FIG. 3, a primary view of the display 310 is shown. In general, the primary view shown in FIG. 3 is considered to be a commonly expected manner in which the mobile device 300 is used and viewed by a user (i.e., passenger). In order to provide a frame of reference, separate sides of the mobile device 300 are labeled in FIG. 3. For example, the mobile device 300 is labeled with a top 320, a left side 330, a right side 340, and a bottom 350.

However, the user may rotate the mobile device 300 about the z-axis in the x-y plane in either direction such that the display 310 is viewed in a landscape orientation as opposed to a portrait orientation as shown. For example, the side 330 may be oriented above 340 or 340 may be oriented above 330 when the display is in the landscape orientation. Furthermore, the display 310 may be oriented in the portrait orientation with the side 350 above the side 320. Accordingly, an area of the display 310 that corresponds with an event spatially related to the vehicle 100 differs depending on a particular orientation of the mobile device 300.

Moreover, the passenger may rotate the mobile device 300 about the y-axis in the x-z plane such that the display 310 is facing, for example, a side panel of the vehicle 100. In addition to rotating the mobile device 300, as discussed, the passenger may also tilt the mobile device 300 about the x-axis when in a reclined position or when, for example, leaning forward and looking downward to maintain a view of the display 310. Thus, the mobile device 300 may be viewed in many different orientations while in use.

Figure 4:
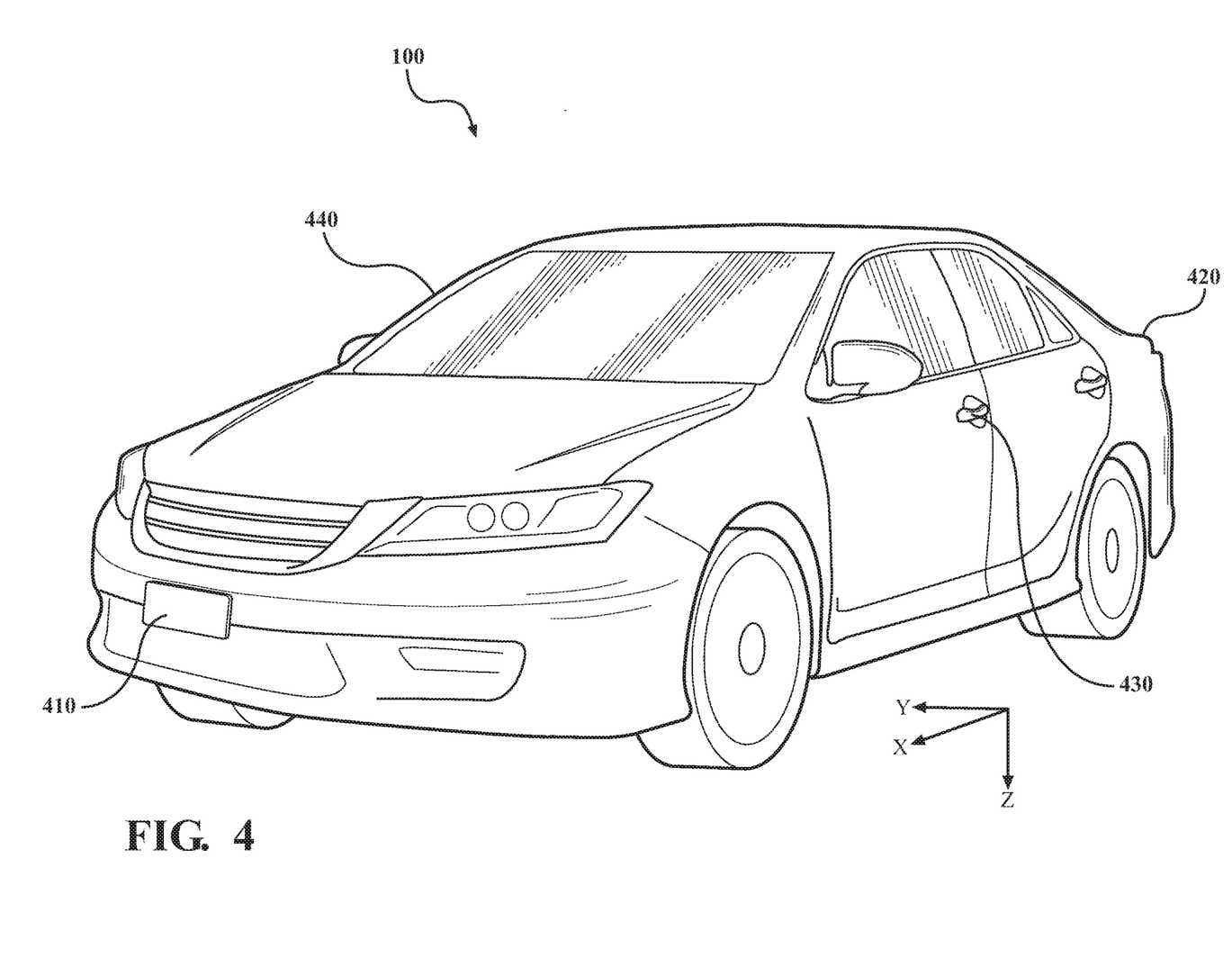
FIG. 4 illustrates another view of the vehicle of FIG. 1.

As further reference, FIG. 4 illustrates one example of the vehicle 100 within which the disclosed systems and methods may operate. FIG. 4 is generally provided to indicate a reference or coordinate system associated with the vehicle 100. It should be noted that the XYZ coordinate system indicated in FIG. 4 does not necessarily align with the XYZ coordinate system shown in FIG. 3 that is relative to the mobile device 300. In either case, the vehicle 100 is generally discussed in relation to a forward portion 410. The forward portion 410 is a leading section of the car that is analogous to a bow or fore section in naval terms. The forward portion 410 is generally understood to be a leading section when the vehicle 100 is in route and a section toward which passengers may commonly face during operation of the vehicle 100. A rear section 420 is a trailing section of the vehicle 100 that is analogous to a stern or aft section in naval terms. The rear section 420 is a section toward which the display 310 of the mobile device 300 faces when a passenger is facing forward, as expected during routine operation of the vehicle 100.

In a left-hand drive version of the vehicle 100, a side panel 430 is referred to as a driver's side of the vehicle 100. The side panel 430 may also be referred to as a left-hand side, or a port side of the vehicle 100. Additionally, a side panel 440 is referred to as a passenger's side of the vehicle, a right-hand side or a starboard side in naval terms. Accordingly, as events occur in relation to the vehicle 100, the various sections 410, 420, 430 and 440 are generally used to define spatial relationships of the events to the vehicle 100.

Of course, because a passenger can move the mobile device 300 about the passenger compartment of the vehicle 100, the spatial system of the vehicle 100 and the mobile device 300 do not always align. Thus, the indication system 170 uses information obtained from the mobile device 300 and, in one embodiment, also information from sensors in the vehicle 100 to translate an orientation of the mobile device 300 into the spatial system of the vehicle 100 so that the indication system 170 can control the mobile device 300 to correctly display a notice relative to a particular location of the vehicle 100.

Figure 5:
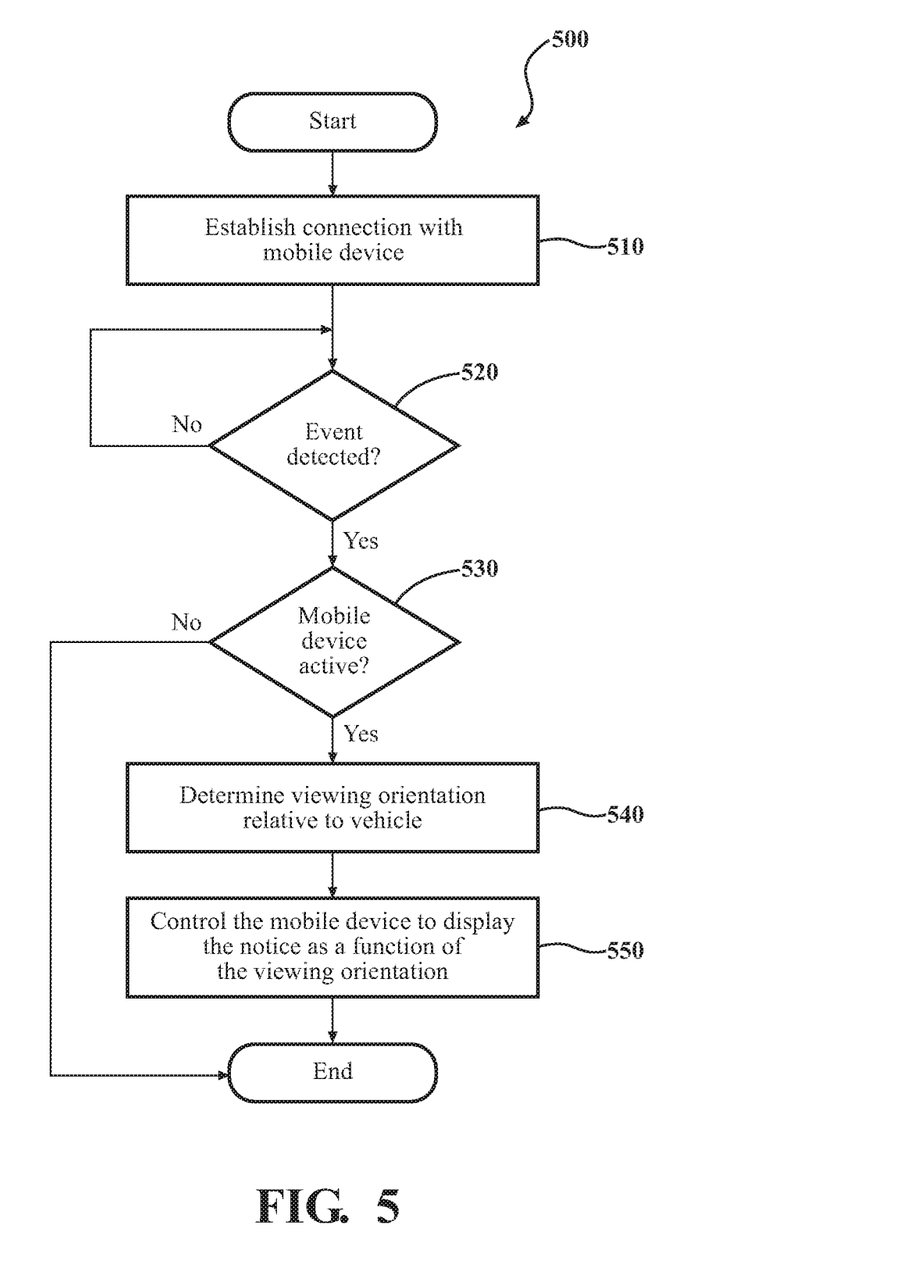
FIG. 5 illustrates one embodiment of a method that is associated with displaying notices on a mobile device according to an orientation of the mobile device within a vehicle.

FIG. 5 illustrates a method 500 associated with controlling a mobile device to display notices according to a relative orientation within a vehicle. Method 500 will be discussed from the perspective of the indication system 170 of FIGS. 1 and 2 and also with reference to FIG. 3 and FIG. 4. Of course, while method 500 is discussed in combination with the indication system 170, it should be appreciated that the method 500 is not limited to being implemented within the indication system 170, but is instead one example of a system that may implement the method 500.

At 510, prior to the occurrence of an event, the wireless access point 240 establishes a connection with the mobile device 300. In one embodiment, establishing the connection includes creating a relationship between the access point 240 and the mobile device 300 so that the mobile device 300 can access one or more resources through the access point 240. For example, the wireless access point 240 may authenticate the mobile device 300 using credentials provided by a passenger through the mobile device 300. Once authenticated, the wireless access point 240 registers the mobile device 300 by generating an entry in the registration table 250. As previously discussed, the registration table 250 may include information about different aspects of the connection/relationship (e.g., permissions, passenger ID, seat location, etc.).

In either case, the registration table 250 identifies which devices are presently active within the vehicle 100 and thus which devices should receive notices about various events. In further aspects, establishing the connection at 510 may also include granting permissions within the mobile device 300 for the indication system 170 to access and control the mobile device 300 and so on. Once the mobile device 300 is registered, then the mobile device 300 is eligible to receive notices from the indication system 300.

Accordingly, at 520, the indication system 170, or more specifically, the orientation module 220, detects an occurrence of an event. In one embodiment, the orientation module 220 continuously monitors for events and may parse events from a stream that are relevant to a passenger of the vehicle 100. For example, the vehicle 100 may provide an electronic signal on the occurrence of many different types and classes of events. However, not all of the events are of appropriate significance to notify passengers. Thus, the orientation module 220, in one embodiment, monitors for select events for which the passenger is to be notified.

The events may include operational hazards, operational notifications, points-of-interest, and other situations relevant to the passengers and operation of the vehicle 100. Examples of the operational hazards include objects in the path of the vehicle 100 along the surface of a travel route or upcoming changes in the configuration of the surface. The operational hazards may be detected while the vehicle 100 is operating in an autonomous mode, semi-autonomous mode, or manual mode. The operational notifications include, for example, impending turns, vehicle speed, fuel level, required maintenance, braking, handover notifications when changing from autonomous to manual mode, navigational events, etc. Examples of the points-of-interest include restrooms, eateries, hotels, tourist destinations and other useful or interesting locations. In general, the points-of-interest are, for example, selected by one or more of the passengers as relevant interests for a particular route/trip. Alternatively, in one embodiment, the points-of-interest are pre-programmed into the indication system 170 as points-of-interest that are relevant to a particular passenger of the vehicle 100.

In either case, the indication system 170 may inform a passenger about the operational hazards, the operational notifications, the points-of-interest or other situations through one or more different types of notices upon being detected at 520.

After an event is detected at 520, at 530, the orientation module 220 identifies whether a mobile device (e.g., device 300) is actively in use by a passenger of the vehicle 100. The orientation module 220 can identify whether the mobile device 300 is active by retrieving information from the registration table 250 that identifies connected devices. Furthermore, the orientation module 220 may select one or more available devices from the registration table 250 to receive the notice according to, for example, a passenger associated with respective devices and/or a severity rating of the notice (e.g., emergency, basic, etc.).

In one embodiment, the indication system 170 maintains a current status of each device in the registration table 250. That is, for example, the indication system 170 periodically polls the devices to determine a present activity state for each of the devices and stores a result in the registration table 250. Alternatively, the orientation module 220 requests that the mobile device 300 provide the present activity state upon detection of the event. To provide the present activity stats, the mobile device 300 may use one or more internal sensors to determine whether the passenger is presently engaged with the mobile device 300. In other words, the mobile device 300 may use a camera to determine a line-of-sight of the passenger, a heart rate monitor to determine if the passenger is sleeping, a proximity sensor to determine if the passenger is holding the mobile device 300, a process monitor to determine if content (e.g., video, entertainment content (movies)) is presently being displayed, and so on.

In one embodiment, a device (e.g., mobile device 300) is considered to be actively in use when the present activity state indicates that the mobile device 300 is currently displaying content to the passenger, and a line-of-sight of the passenger is directed to the mobile device 300. As one example, the orientation module 220 determines when the device is displaying entertainment content such as movies, TV shows, video games and so on. Thus, the orientation module 220 determines that the device 300 is actively in use when displaying entertainment content, as opposed to driving content such as navigation maps, radio, and so on. The orientation module 220 may distinguish between the types of content since a passenger can be engaged to a greater extent by entertainment content as opposed to usual driving content.

However, the present activity state can be tailored to suit a particular implementation and also according to available sensors. Furthermore, in addition to determining whether the mobile device 300 is actively in use at 530, the orientation module 220 may also determine whether the vehicle 100 is operating in an autonomous mode. Thus, in one embodiment, the orientation module 220 provides notices to mobile devices when the vehicle 100 is operating in an autonomous mode and not when, for example, the vehicle 100 is operating in a manual mode in order to avoid excessive notifications, and to avoid distracting the driver.

In either case, if the mobile device 300 is not presently active, then, in one embodiment, the method 500 simply ends since it may provide no value to proceed if the passenger is not viewing the mobile device 300. Alternatively, the notice module 230 may control the mobile device 300 to emit an audible sound, vibrate, or perform another action when the passenger is not actively attentive to the mobile device 300. However, if the mobile device 300 is actively in use, then the indication system 170 proceeds to 540.

At 540, the orientation module 220 determines a viewing orientation for a display 310 of the mobile device 300. While determining the viewing orientation at 540 is discussed in relation to a single device 300, it should be appreciated that the indication system 170 may perform functions at 540 and 550 in parallel for separate devices. In either case, the orientation module 220, in one embodiment, analyzes state information from the mobile device 300 about a present mode of operation for the display 310 in relation to a relative alignment with the vehicle 100.

For example, the orientation module 220 queries the mobile device 300 to cause one or more sensors of the mobile device 300 to provide the state information. Accordingly, in response to the query from the orientation module 220, the mobile device 300 may activate sensors to obtain readings about the present mode of the mobile device 300. This information may include gyroscope readings to identify present pan/tilt angles, GPS data to identify a current orientation/heading and/or GPS location, compass information to identify a heading, state information indicating a present display orientation (e.g., landscape or portrait) and other sensor information as may be suitable for determining a viewing orientation of the mobile device 300 within the vehicle 100.

Furthermore, the orientation module 220 may retrieve information about a present condition of the vehicle 100 in order to translate information about the mobile device 300 into a spatial system that is relative to the vehicle 100. In other words, the orientation module 220, in one embodiment, obtains information such as GPS data in order to define a spatial coordinate system for the vehicle 100 against known aspects of the vehicle 100 (e.g., direction of travel and the fore section 410). Thus, the orientation module 220 can then compare the coordinate system of the vehicle 100 with a determined orientation of the mobile device 300 to determine the viewing orientation of the mobile device 300 within the vehicle 100. Accordingly, the viewing orientation is a relative determination that is a function of an orientation of the vehicle 100 and the mobile device 300.

Still, in a further embodiment, the orientation module 220 triangulates a position of the mobile device 300 within the vehicle 100 using, for example, a series of antennas located throughout the vehicle 100. The orientation module 220, for example, uses the antennas to obtain wireless signal strength information about signal transmissions from the mobile device 300. Subsequently, the orientation module 220 uses the signal strength information to locate the mobile device within the vehicle 100 precisely. This triangulation information may more precisely determine a location of the mobile device 300 by indicating a particular seat of an associated passenger, a height within the vehicle, and, more generally, a precise location within a three-dimensional space defined within the vehicle 100.

From the information provided by the mobile device 300 and, for example, information collected from the vehicle 100, the orientation module 220 determines the viewing orientation by identifying whether the mobile device 300 is displaying content in (i) a landscape mode or (ii) a portrait mode and whether the mobile device 300 is substantially facing (i) a side panel (430 or 440) of the vehicle 100, (ii) a front section 410 of the vehicle 100, or (iii) a rear section 420 of the vehicle. Accordingly, the viewing orientation indicates a relative alignment between a direction in which the display 310 of the mobile device 300 is facing and a direction of travel of the vehicle 100.

Additionally, in one embodiment, the orientation module 220 may perform additional refinements of the viewing orientation using a current position of a seat associated with the passenger, and/or control input information generated by the passenger (i.e., pressing a button in a particular location)

to further specify the viewing orientation. Further examples of determining the viewing orientation will be discussed in relation to FIGS. 6 and 7 subsequently.

At 550, the notice module 230 controls the mobile device 300 to display the notice according to the viewing orientation determined at 540. In one embodiment, the notice module 230 wirelessly instructs the mobile device 300 via the wireless access point 240 to render the notice on the display 310 as a function of the viewing orientation. In this way, the notice module 230 ensures the notice is displayed relative to an alignment between the vehicle 100 and the mobile device 300.

Furthermore, in one embodiment, the notice module 230 can control the mobile device 300 to display the notice in many different ways. Some examples of possible display options for the notice include selectively lighting a relevant portion of the display 310 that corresponds with a relative location of the event in relation to the vehicle 100. For example, when the viewing orientation indicates a standard alignment with the passenger facing the forward section 410, the notice module 230 may illuminate the left section 330 of the display 310 when the vehicle 100 is turning left. Additionally, the notice module 230 may illuminate the top section 320 when a hazard is in front of the vehicle 100. Additional aspects of the notice module 230 controlling the mobile device 300 includes pre-empting content being displayed on the mobile device 300 to instead display the notice, displaying text in a particular location on the display 310 that corresponds with a relative location of the event, illuminating the display 310 using different colors and/or patterns of color to indicate characteristics of the event (e.g., severity), and so on.

Figure 6:
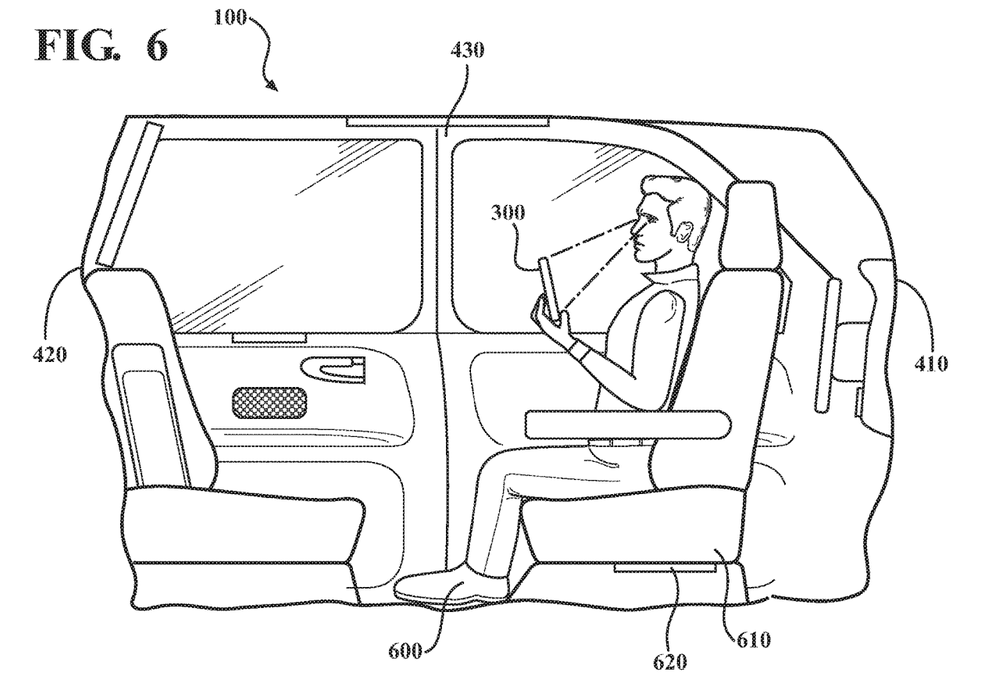
FIG. 6 illustrates an example view of a passenger compartment of the vehicle from FIG. 1 with a seat that is in a reversed position.
Figure 7:
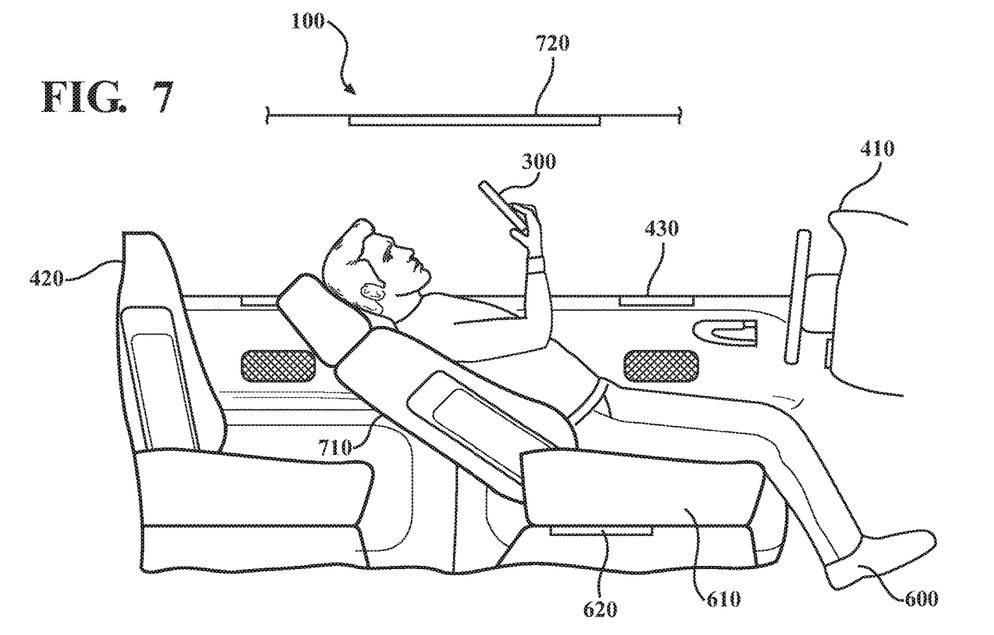
FIG. 7 illustrates an example view of a passenger compartment of the vehicle from FIG. 1 with a seat that is in a substantially reclined horizontal position.

As an example of a few possible viewing orientations within the vehicle 100, consider the examples illustrated in FIGS. 6 and 7. FIG. 6 illustrates a passenger 600 seated facing the rear section 420 of the vehicle 100. A seat 610 of the passenger 600 has been rotated into a reverse position to facilitate this orientation. Furthermore, the passenger 600 is holding the mobile device 300 while seated in a substantially upright posture. Accordingly, the display 310 of the mobile device 300 is facing the forward section 410 of the vehicle 100. Thus, the orientation module 220 analyzes information from querying the mobile device 300, information from, in one embodiment, a seat position circuit 620 (that identifies a relative position of seats within the vehicle), and information from the vehicle 100 (e.g., GPS information) to identify that the mobile device 300 is in the illustrated position relative to the vehicle 100. When in this position the notice module 230 renders directional notices in an opposite location on the display 310 than when the mobile device 300 is facing forward. That is, a left turn signal is displayed on a right side 340 of the display 310 since the device 300 is oriented toward the rear section 420 of the vehicle. As an additional example, braking may be rendered on the sides 330 and 340 when the device 300 is in portrait mode or on sides 320 and 350 when in landscape mode. Furthermore, when in this orientation notices relating to events in front of the vehicle may be rendered on a bottom area 350 while notices relating to events toward the rear 420 of the vehicle may be rendered toward the top 320.

FIG. 7 illustrates the passenger 600 in a substantially reclined position while holding the mobile device 300 roughly parallel with a back 710 of the seat 610. As shown in FIG. 7, the passenger 600 is partially facing toward the front section 410 of the vehicle and a roof panel 720. Accordingly, depending on a degree of the recline, the notice module 230 may instruct the mobile device 300 to display a notice differently. For example, as illustrated in FIG. 7, notices relating to the forward section 410 may be illuminated on a top section 320 of the display 310. However, if the passenger 600 is further reclines, then the notice module 230 may control the mobile device to render notices about the forward section 410 proximate to the bottom 350 of the display 310. Of course, the noted positions are relative to whether the display 310 is being viewed in a portrait mode. If the display 310 is viewed in a landscape mode, then the previously noted example would switch between 340 and 330 as a top and bottom of the display 310 depending on which is oriented upward.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

Furthermore, the vehicle 100 has, for example, a forward/bow end 101 and a rearward/aft/stern end 102. The vehicle 100 has an associated longitudinal axis 103, which can be the central axis of the vehicle 100. The vehicle 100 has an associated longitudinal direction 104. "Longitudinal direction" means any direction that is substantially parallel to and/or co-linear with the longitudinal axis 103. The vehicle 100 has an associated lateral axis 105, which can be substantially perpendicular to the longitudinal axis 103. Additionally, as used herein, a driver's side of the vehicle 100 refers to a port side or left side of the vehicle 100 as viewed from within the vehicle while facing a direction of travel. Moreover, a passenger's side refers to a right-hand side or starboard side of the vehicle. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. The terrain map(s) 117 can be high quality and/or highly detailed.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated continuously, periodically, irregularly, or even randomly to reflect additions, removals, and/or changes within a mapped area.

The one or more data stores 115 can include sensor data 119. In this context, "sensor data" means any information about the sensors that the vehicle 100 is equipped with, including the capabilities, parameters, characteristics, ranges, and other information about such sensors. As will be explained below, the vehicle 100 can include a sensor system 120. The sensor data 119 can relate to one or more sensors of the sensor system 120. As an example, in one or more arrangements, the sensor data 119 can include information on one or more LIDAR sensors 124 of the sensor system 120. Such information can include, for example, the number of outbound sensor signals emitted by the LIDAR or other sensor(s), the maximum working range of one or more of such outbound sensor signals, the arrangement of the outbound sensor signals, the orientation of the outbound sensor signals, and/or the frequency at which the outbound sensor signals are emitted. Such data can be obtained from any suitable source, including a sensor manufacturer, the vehicle manufacturer, and/or based on test data, just to name a few possibilities.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100. The map data 116 and/or the sensor data 119 can be obtained by the vehicle 100 from any suitable source, including a sensor manufacturer, the vehicle manufacturer, and/or based on test data, just to name a few possibilities.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the vehicle 100. In one or more arrangements, the vehicle sensor(s) 121 can include a speedometer (not shown). The speedometer can determine a current speed of the vehicle 100, or data acquired by the speedometer can be used to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 122 can include a global navigation satellite system (GNSS), a global positioning system (GPS), a navigation system (which can be the navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect and/or sense something using at least radio signals. The one or more radar sensors 123 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle and/or the movement of each detected obstacle.

In one or more arrangements, the sensor system 120 can include one or more LIDAR sensors 124. "LIDAR sensor" means any device, component and/or system that can detect, and/or sense obstacles using at least lasers. The LIDAR sensor can include a laser source and/or laser scanner configured to emit a laser signal and a detector configured to detect reflections of the laser signal. The one or more LIDAR sensors 124 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

In one or more arrangements, the sensor system 120 can include one or more sonar sensors 125. "Sonar sensor" means any device, component and/or system that can detect, and/or sense something using at least sound waves. The one or more sonar sensors 125 can be configured to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions (e.g. in the longitudinal direction 104, the lateral direction 106 and/or other direction(s)), the elevation of each detected obstacle, the speed of each detected obstacle, and/or the movement of each detected obstacle.

The sensor system 120 can include can include one or more cameras 126. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented to capture visual data from at least a portion of the external environment of the vehicle 100. Visual data acquired by the one or more cameras 126 can be used to detect, and/or sense, directly or indirectly, the presence of one or more obstacles in the external environment of the vehicle 100, the position of each detected obstacle relative to the vehicle 100, the distance between each detected obstacle and the vehicle 100 in one or more directions, the elevation of each detected obstacle, the speed of each detected obstacle, and/or the movement of each detected obstacle.

The one or more cameras 126 can be high-resolution cameras. The high resolution can refer to the pixel resolution, the spatial resolution, spectral resolution, temporal resolution and/or radiometric resolution. In one or more arrangements, the one or more cameras 126 can be high dynamic range (HDR) cameras or infrared (IR) cameras. The one or more cameras 126 can capture visual data in any suitable wavelength on the electromagnetic spectrum.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100, and/or one or more sensors can be located so as to be exposed to the exterior of the vehicle 100.

The sensor system 120 can include one or more ranging sensors. "Ranging sensors" include sensors that can detect, and/or sense obstacles from a distance and do not require physical contact with the obstacle. The various environment sensors 122 described above are examples of ranging sensors. Alternatively, or in addition to one or more of the above examples, one or more sensors can be configured to detect, and/or sense the location of the vehicle 100 and/or the location of obstacles in the environment relative to the vehicle 100. Any suitable sensor can be used for such purposes. Such sensors may work independently and/or in combination with a positioning system of the vehicle 100.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed. A general description of the operation of a LIDAR sensor 124 is shown in FIG. 2. However, it will be understood that the description is applicable to other environment sensors 122.

The vehicle 100 can include an input system 130. An "input system" includes any device, component, system, element or arrangement or groups thereof that enable information/data to be entered into a machine. The input system 130 can receive an input from a vehicle passenger (e.g. a vehicle operator and/or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle passenger (e.g. a person, a vehicle passenger, etc.). The output system 135 can present information/data to a vehicle passenger. The output system 135 can include a display. Alternatively, or in addition, the output system 135 may include a microphone, earphone, and/or speaker. Some components of the vehicle 100 may serve as both a component of the input system 130 and a component of the output system 135.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An indication system of a vehicle, comprising:
   one or more processors;
   a memory communicably coupled to the one or more processors and storing:
      an orientation module including instructions that when executed by the one or more processors cause the one or more processors to, in response to an electronic signal indicating an occurrence of an event associated with the vehicle, identify whether a mobile device is actively in use by a passenger of the vehicle, wherein the event is an incident associated with the vehicle for which the passenger is to be notified, and
      wherein the orientation module includes instructions to, when the mobile device is in active use, determine a viewing orientation for a display of the mobile device by analyzing state information from the mobile device about a present mode of operation for the display in relation to a relative alignment with the vehicle; and
   a notice module including instructions that when executed by the one or more processors cause the one or more processors to control the mobile device to display a notice according to the viewing orientation by wirelessly instructing the mobile device to render the notice on the display as a function of the viewing orientation to display the notice relative to an alignment between the vehicle and the mobile device.

2. The indication system of claim 1, wherein the orientation module further includes instructions to determine the viewing orientation by querying the mobile device to cause one or more sensors of the mobile device to provide the state information in response to the querying, wherein orientation module includes instructions to determine the viewing orientation by identifying whether the mobile device is oriented in (i) a landscape mode or (ii) a portrait mode, and whether the mobile device is facing (i) a side panel of the vehicle, (ii) a front section of the vehicle, or (iii) a rear section of the vehicle, and
   wherein the viewing orientation indicates a relative alignment between a direction in which the display of the mobile device is facing and a direction of travel of the vehicle.

3. The indication system of claim 1, wherein the orientation module further includes instructions to query sensors of the mobile device include a global position system (GPS) sensor, an accelerometer, and a compass, and wherein the orientation module includes instructions to query the sensors by activating the sensors of the mobile device using a remote procedure call.

4. The indication system of claim 1, wherein the orientation module further includes instructions to identify whether the mobile device is actively in use by retrieving information from a registration table that identifies connected devices in the vehicle and requesting that the mobile device provide an indication about a present activity state, and
   wherein the mobile device is actively in use when the present activity state indicates that the mobile device is currently displaying entertainment content to the passenger, and a line-of-sight of the passenger is directed to the mobile device.

5. The indication system of claim 1, wherein the orientation module further includes instructions to identify whether the mobile device is actively in use by determining whether the vehicle is operating in an autonomous mode, and
   wherein the orientation module further includes instructions to determine the viewing orientation by refining a determination of the viewing orientation using (i) a current position of a seat associated with the passenger, and (ii) a position of the mobile device within a passenger compartment of the vehicle as triangulated according to wireless signals from the mobile device.

6. The indication system of claim 1, wherein the notice module further includes instructions to control the mobile device to display the notice by selectively illuminating a portion of the display that corresponds with a relative location of the event in relation to the vehicle and the viewing orientation of the mobile device, wherein the occurrence of the event is a turning of the vehicle, a braking of the vehicle, a handover from an autonomous mode to a manual mode, or a navigation event of the vehicle.

7. The indication system of claim 1, wherein the notice module further includes instructions to control the mobile device to display the notice by controlling the mobile device to pre-empt content on the display of the mobile device to render the notice instead of the content, and wherein the notice module further includes instructions to control the display by illuminating a portion of the display that is a corner that corresponds with a direction of the event.

8. The indication system of claim 1, further comprising:
a wireless access point configured to, prior to the occurrence of the event, establish a connection with the mobile device by creating a relationship with the mobile device for the mobile device to access at least one resource through the wireless access point,
wherein the wireless access point is configured to register the mobile device in a registration table that identifies active devices in use within the vehicle when establishing the connection.

9. The indication system of claim 1, wherein the passenger is a driver of the vehicle, wherein the mobile device is a smartphone, and wherein the orientation module includes instructions to determine the viewing orientation by determining a location of the mobile device within a passenger compartment of the vehicle by using characteristics associated with the mobile device to triangulate the location.

10. A non-transitory computer-readable medium storing instructions that when executed by one or more processors cause the one or more processors to:
in response to an electronic signal indicating an occurrence of an event associated with a vehicle, identify whether a mobile device is actively in use by a passenger of the vehicle, wherein the event is an incident associated with the vehicle for which the passenger is to be notified;
when the mobile device is in active use, determine a viewing orientation for a display of the mobile device by analyzing state information from the mobile device about a present mode of operation for the display in relation to a relative alignment with the vehicle; and
control the mobile device to display a notice according to the viewing orientation by wirelessly instructing the mobile device to render the notice on the display as a function of the viewing orientation to display the notice relative to an alignment between the vehicle and the mobile device.

11. The non-transitory computer-readable medium of claim 10, wherein the instructions to cause the one or more processors to determine the viewing orientation include instructions to query the mobile device to cause one or more sensors of the mobile device to provide the state information in response to the querying, wherein the instructions to cause the one or more processors to determine the viewing orientation include instructions to identify whether the mobile device is oriented in (i) a landscape mode or (ii) a portrait mode, and whether the mobile device is facing (i) a side panel of the vehicle, (ii) a front section of the vehicle, or (iii) a rear section of the vehicle, and
wherein the viewing orientation indicates a relative alignment between a direction in which the display of the mobile device is facing and a direction of travel of the vehicle.

12. The non-transitory computer-readable medium of claim 10, wherein the instructions to cause the one or more processors to identify whether the mobile device is actively in use include instructions to retrieve information from a registration table in the vehicle that identifies connected devices and to request that the mobile device provide an indication about a present activity state, and
wherein the mobile device is actively in use when the present activity state indicates that the mobile device is currently displaying content to the passenger, and a line-of-sight of the passenger is directed to the mobile device.

13. The non-transitory computer-readable medium of claim 10, wherein the instructions to cause the one or more processors to control the mobile device to display the notice include instructions to selectively illuminate a relevant portion of the display that corresponds with a relative location of the event in relation to the vehicle and the viewing orientation of the mobile device, wherein the occurrence of the event is a turning of the vehicle, a braking of the vehicle, a handover from an autonomous mode to a manual mode, or a navigation event of the vehicle.

14. A method of providing notifications within a vehicle, comprising:
in response to an electronic signal indicating an occurrence of an event associated with the vehicle, identifying whether a mobile device is actively in use by a passenger of the vehicle, wherein the event is an incident associated with the vehicle for which the passenger is to be notified;
when the mobile device is in active use, determining a viewing orientation for a display of the mobile device by analyzing state information from the mobile device about a present mode of operation for the display in relation to a relative alignment with the vehicle; and
controlling the mobile device to display a notice according to the viewing orientation by wirelessly instructing the mobile device to render the notice on the display as a function of the viewing orientation to display the notice relative to an alignment between the vehicle and the mobile device.

15. The method of claim 14, wherein determining the viewing orientation includes querying the mobile device to cause one or more sensors of the mobile device to provide the state information in response to the querying, wherein determining the viewing orientation includes identifying whether the mobile device is oriented in (i) a landscape mode or (ii) a portrait mode, and whether the mobile device is facing (i) a side panel of the vehicle, (ii) a front section of the vehicle, or (iii) a rear section of the vehicle, and
wherein the viewing orientation indicates a relative alignment between a direction in which the display of the mobile device is facing and a direction of travel of the vehicle.

16. The method of claim 14, wherein identifying whether the mobile device is actively in use includes retrieving information from a registration table in the vehicle that identifies connected devices and requesting that the mobile device provide an indication about a present activity state, and
wherein the mobile device is actively in use when the present activity state indicates that the mobile device is currently displaying content to the passenger, and a line-of-sight of the passenger is directed to the mobile device.

17. The method of claim 14, wherein identifying whether the mobile device is actively in use includes determining whether the vehicle is operating in an autonomous mode, and wherein determining the viewing orientation includes refining a determination of the viewing orientation by using (i) a current position of a seat associated with the passenger, and (ii) a position of the mobile device within a passenger compartment of the vehicle as triangulated according to wireless signals from the mobile device.

18. The method of claim 14, wherein controlling the mobile device to display the notice includes selectively illuminating a relevant portion of the display that corresponds with a relative location of the event in relation to the vehicle and the viewing orientation of the mobile device, wherein the occurrence of the event is a turning of the vehicle, a braking of the vehicle, a handover from an autonomous mode to a manual mode, or a navigation event of the vehicle.

19. The method of claim 14, wherein controlling the mobile device to display the notice includes pre-empting content on the display of the mobile device to display the notice instead of the content, and wherein controlling the display includes illuminating a portion of the display that is a corner that corresponds with a direction of the event.

20. The method of claim 14, further comprising:

prior to the occurrence of the event, establishing, by an access point of the vehicle, a connection with the mobile device, wherein establishing the connection includes creating a relationship between the access point and the mobile device for the mobile device to access at least one resource through the access point, and wherein establishing the connection includes registers the mobile device in a registration table that identifies active devices in use within the vehicle.

* * * * *